(12) United States Patent
Cho et al.

(10) Patent No.: US 7,930,758 B2
(45) Date of Patent: Apr. 19, 2011

(54) DIGITAL RIGHTS MANAGEMENT METHOD AND DIGITAL RIGHTS MANAGEMENT-ENABLED MOBILE DEVICE

(75) Inventors: Hyun Wook Cho, Daegu Metropolitan (KR); Dae Gyue Park, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1133 days.

(21) Appl. No.: 11/652,480

(22) Filed: Jan. 12, 2007

(65) Prior Publication Data

US 2008/0016581 A1 Jan. 17, 2008

(30) Foreign Application Priority Data

Jul. 11, 2006 (KR) .................. 10-2006-0064889

(51) Int. Cl.
*G06F 17/30* (2006.01)
(52) U.S. Cl. ........................................... 726/27
(58) Field of Classification Search .............. 726/27
See application file for complete search history.

(56) References Cited

U.S. PATENT DOCUMENTS

| 5,629,980 | A | 5/1997 | Stefik et al. ............... 380/4 |
| 6,442,517 | B1 | 8/2002 | Miller et al. ............. 704/201 |
| 6,522,866 | B1 | 2/2003 | Merkle et al. ............. 455/59 |
| 2002/0006204 | A1 | 1/2002 | England et al. |
| 2002/0077988 | A1* | 6/2002 | Sasaki et al. ............. 705/59 |
| 2004/0174996 | A1 | 9/2004 | Tewfik et al. ............. 380/44 |
| 2005/0044223 | A1* | 2/2005 | Meyerson ................ 709/225 |
| 2006/0069644 | A1 | 3/2006 | Vataja et al. |

FOREIGN PATENT DOCUMENTS

| CN | 1625097 A | 6/2005 |
| KR | 102006009913 A | 9/2006 |
| WO | WO 2005/124573 A1 | 12/2005 |

* cited by examiner

*Primary Examiner* — Jacob Lipman
(74) *Attorney, Agent, or Firm* — Roylance, Abrams, Berdo & Goodman, LLP

(57) ABSTRACT

A DRM method and DRM-enabled mobile device are provided, in which determinations are made as to whether a playback request is input for replaying a media file, and, if so, whether the media file is a rights-protected media file on the basis of a file format of the media file. If the media file is a rights-protected media file, at least one sample playback part of the rights-protected media file is verified and replayed; otherwise, the entire rights-protected media file is replayed.

9 Claims, 3 Drawing Sheets

DIGITAL RIGHTS MANAGEMENT METHOD AND DIGITAL RIGHTS MANAGEMENT-ENABLED MOBILE DEVICE

CROSS-REFERENCE TO RELATED PATENT APPLICATION

This application claims the benefit under 35 U.S.C. §119(a) of Korean Patent Application filed in the Korean Intellectual Property Office on Jul. 11, 2006 and assigned Serial No. 2006-0064889, the entire disclosure of which is hereby incorporated by reference.

BACKGROUND OF THE INVENTION

1. Field of the Invention

The present invention relates to a digital rights management (DRM). More particularly, the present invention relates to a DRM method and DRM-enabled mobile device.

2. Description of the Related Art

Mobile commerce (M-commerce) is becoming increasingly important as the number of mobile users grows rapidly worldwide, and the mobile networks and services expand to countrywide and worldwide coverage. M-commerce is simply a way to conduct electronic commerce using mobile devices. M-commerce usually involves multiple independent business entities as instant mobile operators, service providers, enabling technology providers, and mobile users. Coordination and interoperability has become a great concern in such a business setting. Moreover, the success of M-commerce is also dependent upon the mutual trust among these entities. For example, when intellectual property is a concern of a business, privacy and trust become requirements of the business. Furthermore, other business components, such as payment and security also play important roles in M-commerce.

Media distribution services, including video conferencing, video-on-demand, and online music distribution are major mobile businesses. Digital Rights Management (DRM) is required in media distribution services to protect the intellectual property of the distributed digital media. DRM technology includes rights insertion, rights enforcement, license management, license (or media) sharing and the like. Rights insertion and rights enforcement are responsible for basic DRM operations. License management is to manage the usage and access rights of purchased media. License (or media) sharing that involves processes of transferring rights and issuing authorization is a demanding feature in media distribution services. Payment is highly related to DRM operations, as usage and access rights are mainly due to the purchasing agreements and terms.

Rights-protected contents can be copied from a personal computer or exchanged between mobile devices using infrared technology based on Infrared Data Association (IrDA) or Bluetooth technology, or using an external memory and hard disk. Even though the rights-protected contents are copied from another device and media, the user should obtain a license to play the contents.

However, the conventional DRM method does not give an unlicensed user a chance to pre-experience a copied content, even though the unlicensed user may be an expected buyer.

The conventional DRM method also has a shortcoming in that an unlicensed user should buy a multimedia content without being able to verify whether the multimedia content is content that is expected, resulting in a risk of unwanted payment, and leading to a negative experience of the right protected contents.

Accordingly, there is a need for an improved digital rights management method and digital rights management-enabled mobile device that allows verification of multimedia content.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a digital rights management (DRM) method and DRM-enabled mobile device that are capable of pre-checking content of a rights-protected media file.

It is an aspect of exemplary embodiments of the present invention to provide a DRM method and DRM-enabled mobile device that allow an unlicensed user to play back a sample playback part of a rights-protected media file.

It is an aspect of exemplary embodiments of the present invention to provide a DRM method and a DRM-enabled mobile device that are capable of configuring a sample playback part and length of a copied rights-protected media file.

In accordance with an aspect of exemplary embodiments of the present invention, the above and other objects can be accomplished by a digital rights management method for a mobile device, in which whether a playback request is input for replaying a media file is determined; if a playback request is input for replaying a media file, whether the media file is a rights-protected media file on the basis of a file format of the media file is determined; if the media file is a rights-protected media file, at least one sample playback part of the rights-protected media file is verified and replayed; and if the media file is not a rights-protected media file, the entire rights-protected media file is replayed.

In accordance with another aspect of exemplary embodiments of the present invention, the above and other objects can be accomplished by a digital rights management method for a mobile device, in which whether a playback request is input for replaying a media file is determined; if a playback request is input for replaying a media file, whether the playback request is performed by a licensed user of the media file with reference to an information field of the media file is determined; if the playback request is performed by an unlicensed user, whether the media file has at least one sample playback part of the rights-protected media file and a playback of the sample playback part is permitted is determined; if the media file has at least one sample playback part of the rights-protected media file and a playback of the sample playback part is permitted, start and end times of the sample playback part are extracted; and the sample playback part according to the start and end times are replayed.

In accordance with another aspect of exemplary embodiments of the present invention, the above and other objects can be accomplished by a digital rights management (DRM)-enabled device, in which a memory unit stores programs for operating the DRM-enabled device and media files transferred from outside; a contents processing unit processes a media file to be replayed on the basis of a file format of the media file; and a control unit controls operations of the DRM-enabled device, interoperability between the units, and processes for replaying the media files according to a playback request.

BRIEF DESCRIPTION OF THE DRAWINGS

The above and other objects, features and advantages of certain exemplary embodiments of the present invention will be more apparent from the following detailed description in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In exemplary embodiments of the present invention, a rights-protected media file is provided with a protection free playback part such that an unlicensed user can preview content of the rights-protected media file.

The exemplary embodiments of the present invention is described for a DRM-enabled mobile device as an example, but can be applied to other devices such as personal digital assistants (PDAs), smart phones, MP3 Players, laptop computers, personal computers, digital cameras, cellular phones, personal communication service (PCS) phones, dedicated digital multimedia broadcasting (DMB) receivers, International Mobile Telecommunication 2000 (IMT-2000) terminals, Universal Mobile Telecommunication Service (UMTS) terminals, and the like.

Figure 1:
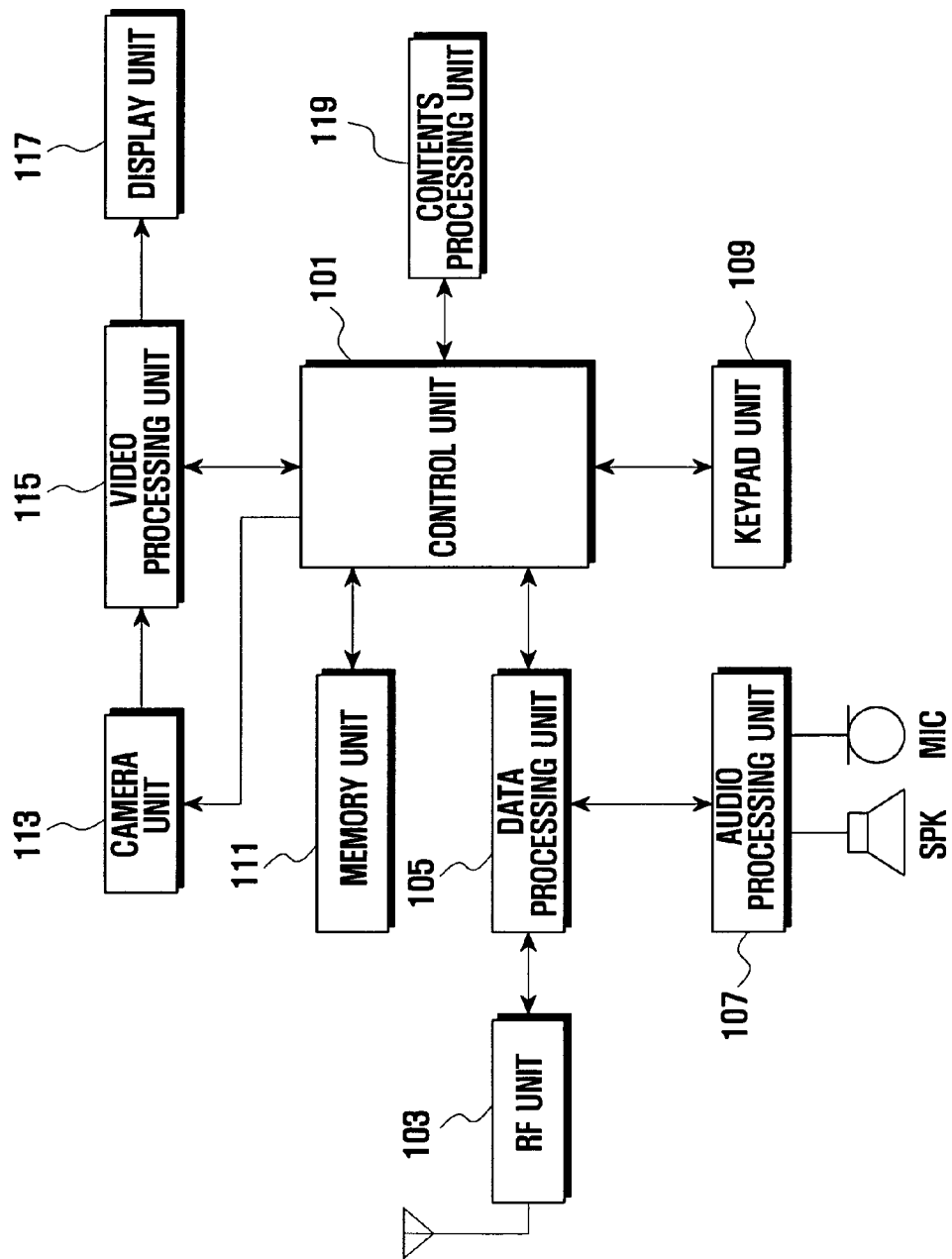
FIG. 1 is a block diagram illustrating a configuration of a DRM-enabled mobile device according to an exemplary embodiment of the present invention.

FIG. 1 is a block diagram illustrating a configuration of a DRM-enabled mobile device according to an exemplary embodiment of the present invention.

Referring to FIG. 1, the DRM-enabled mobile device includes a control unit 101, a radio frequency (RF) unit 103, a data processing unit 105, an audio processing unit 107, a keypad unit 109, a memory unit 111, a camera unit 113, a video processing unit 115, a display unit 117, and a contents processing unit 119.

The RF unit 103 comprises a radio frequency transmitter and a radio frequency receiver, both of which are coupled to an antenna used for transmitting and receiving radio signals through an air channel. The RF unit 103 is coupled to the data processing unit 105, which processes digital signals into a form that can be transmitted by the transmitter of RF unit 103 or processes baseband signals received and modulated by the receiver of the RF unit 103 into digital form for other units of the mobile device.

The data processing unit 105 is further coupled to the control unit 101, which controls operation of the mobile device in accordance with instructions stored in the memory unit 111. The data processing unit 105 handles all audio, signal and data processing needed to receive and send data using RF transmission or Bluetooth transmissions. The data processing unit 105 also includes a means for encoding and modulating a signal to be transmitted through the RF unit 103 and a means for demodulating and decoding a signal received through the RF unit 103. In addition, the data processing unit 150 is provided with a codec pack for supporting encoding and decoding of the video and audio data.

The audio processing unit 107 converts analog audio signals received at a microphone into digital signals and converts digital audio signals received from the data processing unit 105 into analog audio signals to be played over a speaker.

The keypad unit 109 includes a plurality of alphanumeric keys for enabling a user to input alphanumeric characters and various function keys enabling the user to input commands for operating corresponding functions.

The memory unit 111 includes a program memory and a data memory. The program memory stores programs for controlling general operations of the mobile device and application programs for handling a camera function, sound playback function, and image and motion picture playback function of the mobile device.

The data memory temporarily stores data generated during the operations of the programs and a database for arranging the data in the form of a table. The data memory also stores media files transferred from an external memory and hard disk, and downloaded from a contents server and a web server.

An exemplary embodiment of the present invention is described with media files obtained from an external source with respect to the DRM-enabled mobile device, in order to clarify the features of the invention.

The camera unit 113 takes a picture and converts the picture of analog signals into video signals in interoperation with an encoder (not shown). The video processing unit 115 converts video signals from the camera into image signals such that the image signals are processed to be appropriate for the display unit 117. The camera unit 113 includes a camera sensor for sensing an image on the lens and converting the optical image signal into an electric signal and a signal processor for converting the analog signal output from the camera sensor into a digital signal. The camera is implemented with a charge coupled device (CCD) or a complementary metal oxide semiconductor (CMOS) sensor, and the signal processor is a digital signal processor (DSP). The camera sensor and the signal processor can be integrated as a single module.

The video processing unit 115 processes the application data image and menu screen image to be suitable for the display unit 117 and then transmits the processed images to the display unit 117 under the control of the control unit 101. The video processing unit 115 is provided with a function for compression/decompression of the video data and at least one video codec. The video codec includes a JPEG codec, a MPEG4 codec, Wavelet codec, and the like.

The display unit 117 presents the video data output from the video processing unit 115. The display unit 117 can be implemented with a Liquid Crystal Display (LCD) and a touchscreen function. When an LCD supporting the touchscreen function is implemented, the display unit 117 can operate as an input means.

The contents processing unit 119 is responsible for operations related to playback of the contents (media files) according to a user's request. The contents processing unit 119 determines whether the media file requested to be played is a rights-protected media file. In the case of a rights-protected media file, the contents processing unit 119 extracts information on a sample playback part of the rights-protected media file and then plays back the sample playback part. That is, the contents processing unit 119 processes the rights-protected media file to be played using only the sample playback part when a playback attempt is performed by an unlicensed user.

The header of the rights-protected media file is specified as in Tables 1 and 2.

The control unit 101 controls the signal exchanges between the elements constituting the mobile device. The data processing unit 105 and the contents processing unit 119 can be incorporated into the control unit 101.

The control unit 101 also controls interoperability and coordination among the data processing unit 105, the keypad unit 109, the memory unit 111, the camera unit 113, the video processing unit 115, and the contents processing unit 119.

The control unit 101 determines whether a playback attempt to the rights-protected media file is performed by a licensed user and replays the rights-protected media file at using only the sample playback part, if the playback attempt is performed by an unlicensed user.

Figure 2:
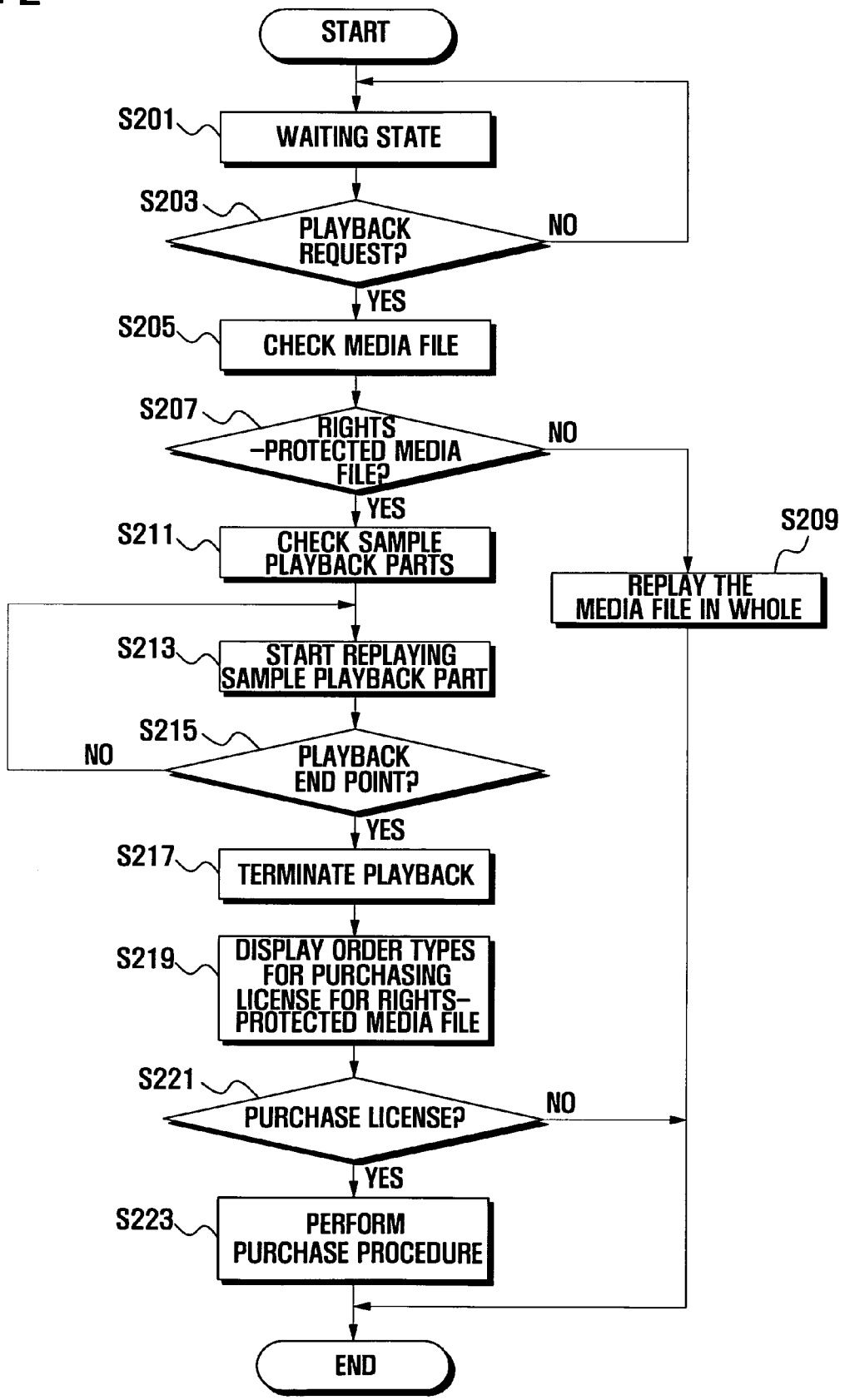
FIG. 2 is a flowchart illustrating a DRM method according to an exemplary embodiment of the present invention.

FIG. 2 is a flowchart illustrating a DRM method according to an exemplary embodiment of the present invention.

Referring to FIG. 2, while in a waiting state (S201), the DRM-enabled mobile device determines whether a playback request is input for a media file (S203).

If a playback request is input, the DRM-enabled mobile device analyzes the playback requested media file (S205) and determines whether the playback requested media file is a rights-protected media file (S207). The rights-protected media file can be distinguished by a media file format shown in Table 1.

TABLE 1

| Item | Type | Purpose |
|---|---|---|
| Version | Unit8* | Version Number |
| ContentURILen | Unit8 | ContentURI Item Length |
| ContentTypeLen | Unit8 | ContentType Item Length |
| ContentURI | ContentURILen Octets | Unique Identifier of the DRM Content |
| ContentType | ContentTypeLen Octets | MIME Media Type of Original Content |
| HeadersLen | Uintvar* | Headers Item Length |
| DataLen | UintVar | Data Item Length |
| Headers | HeadersLen Octets | Additional META data-specified DRM contents, Original contents |
| Data | DataLen Octets | Packaged Original Content Data |

As shown in Table 1, the rights-protected media file format includes a file header and a data region. The file header preferably includes a version field, a ContentURILen field, a ContentTypeLen field, ContentURI field, a ContentType field, a HeadersLen field, a DataLen field, and a headers field. If the playback requested media file has a file format of Table 1, the DRM-enabled mobile device determines that the playback requested media file is a rights-protected media file.

If the playback requested media file is not a rights-protected media file, the DRM-enabled mobile device starts playback of the whole length of the media file (S209).

If it is determined that the playback requested media file is a rights-protected media file, the DRM-enabled mobile device obtains a sample playback part of the rights-protected media file (S211) and starts replaying the sample playback part of the rights-protected media file (S213).

While replaying the sample playback part, the DRM-enabled mobile device monitors for a playback end point of the sample playback part (S215).

When the playback end point of the sample playback part is detected, the DRM-enabled mobile device terminates replaying the sample playback part (S217).

The processes from step S211 to step S217 can be performed with reference to the headers field of the file format of Table 1. The header field includes metadata containing additional information on the media file, especially on the sample playback part of the rights-protected media file.

In an exemplary embodiment of the present invention, the header field is specified as shown in Table 2.

TABLE 2

| Item | Type | Purpose |
|---|---|---|
| SamplePlayEnable | Unit8 | TRUE: Sample playback FALSE: Sample playback Rejected |
| TimeNum n | Unit8 | Quantity of Sample playback parts |
| StartTimeLen 1 | Unit8 | Length of start time of Sample playback part 1 |
| StartTime 1 | Unit8* | Start time (ms) |
| EndTimeLen 1 | Unit8 | Length of end time of Sample playback part 1 |
| EndTime 1 | Unit8* | End time (ms) |
| StartTimeLen 2 | Unit8 | Length of start time of Sample playback part 2 |
| StartTime 2 | Unit8* | Start time (ms) |
| EndTimeLen 2 | Unit8 | Length of end time of Sample playback part 2 |
| EndTime 2 | Unit8* | End time (ms) |
| StartTimeLen n | Unit8 | Length of start time of Sample playback part n |
| StartTime n | Unit8* | Start time (ms) |
| EndTimeLen n | Unit8 | Length of end time of Sample playback part n |
| EndTime n | Unit8* | End time (ms) |

The DRM-enabled mobile device refers to information of the header field shown in Table 2 and replays the sample playback part according to the information of the header field.

After terminating replaying the sample playback part, the DRM-enabled mobile device displays order types for purchasing a license on the rights-protected media file together with a Uniform Resource Locator (URL) of a web server at which a user obtains a license for the rights-protected media file (S219).

While displaying the license order types, the DRM-enabled mobile device determines whether a key input is performed for purchasing the license (S221).

If a key input is performed for purchasing the license, the DRM-enabled mobile device performs an operation for purchasing the license (S223).

Figure 3:
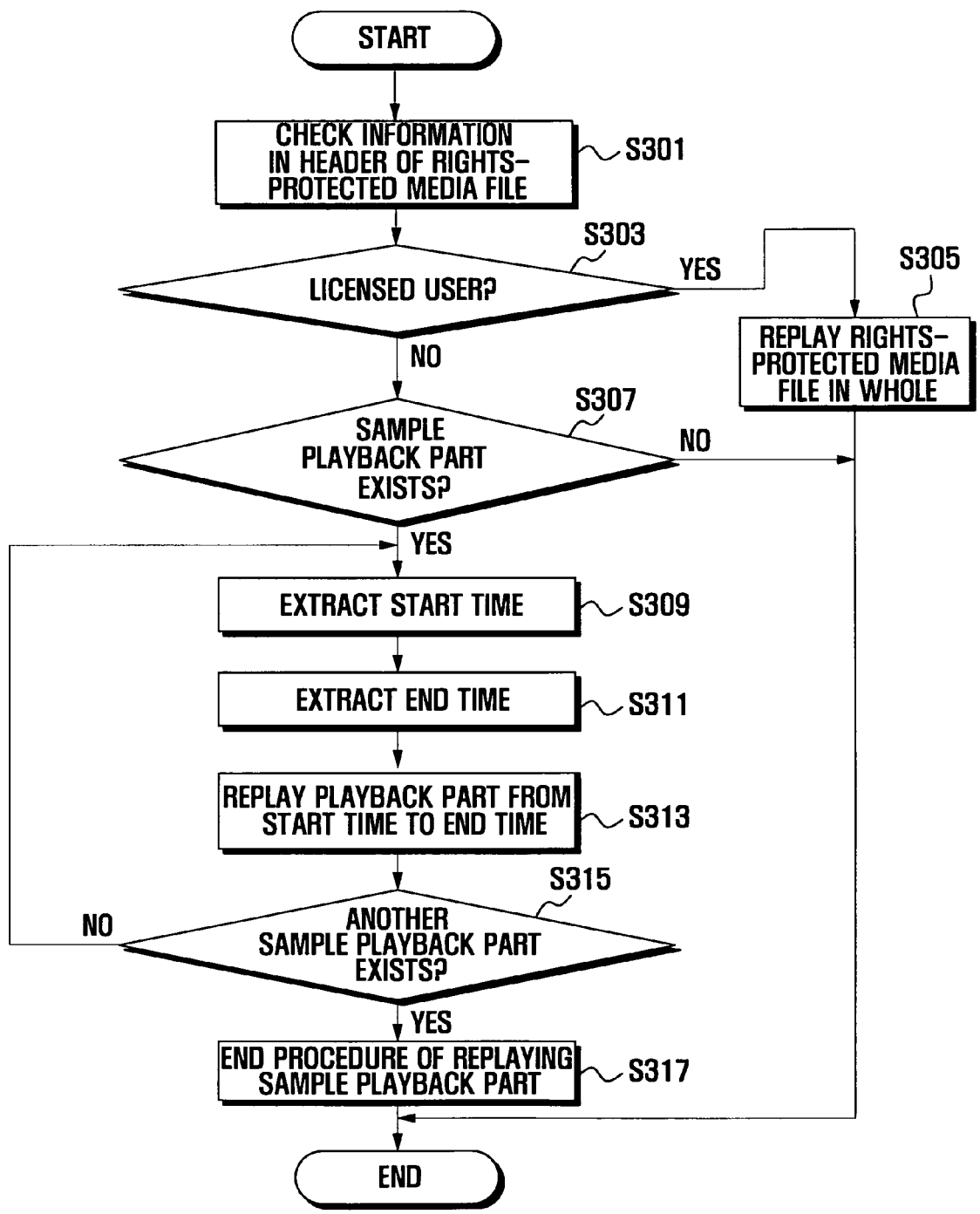
FIG. 3 is a flowchart illustrating a procedure of replaying a sample playback part of the rights-protected media file in the DRM method of FIG. 2.

FIG. 3 is a flowchart illustrating a procedure of replaying a sample playback part of the rights-protected media file in the DRM method of FIG. 2.

In FIG. 3 the procedure of replaying the sample playback part of the rights-protected media file is performed with reference to Table 2 and it is assumed that the playback requested media file is a rights-protected media file.

Referring to FIG. 3, if it is determined that the playback requested media file is a rights-protected media file, the DRM-enabled mobile device checks information contained in the header of the media file (S301) and determines whether the user has a license for the media file on the basis of the information (S303).

Through steps S301 and S303, if a playback request input is detected, the DRM-enabled mobile device can determine whether the user has a license to replay the media file with reference to the information contained in the header of the media file, shown in Table 1. The ContentURI field in Table 1, which is a unique identifier of the rights-protected media file, is the information with which the DRM-enabled mobile device can determine whether the user has the license for the rights-protected media file.

If it is determined that the user has the license for the rights-protected media file, the DRM-enabled mobile device starts replaying the rights-protected media file (S305).

If it is determined that the user does not have the license for the rights-protected media file, the DRM-enabled mobile device determines whether the rights-protected media file has a sample playback part (S307).

The DRM-enabled mobile device can determine whether a sample playback part exists by referring to a value of the SamplePlayEnable field shown in Table 2. The SamplePlayEnable field includes information on the existence of the sample playback part and whether to allow replaying the sample playback part.

Accordingly, the DRM-enabled mobile device can determine whether the sample playback part exists in the rights-protected media file on the basis of the SamplePlayEnable field.

If it is determined that the sample playback part does not exist or replaying the sample playback part is refused, the DRM-enabled mobile device terminates the procedure for replaying the sample playback part.

If the sample playback part exists and the playback of the sample playback part is allowed, the DRM-enabled mobile device extracts information on the start time (S309) and on the end time (S311) of the sample playback part from the StartTimeLen n field and the EndTimeLen n field in Table 2, respectively.

The StartTimeLen n field and the EndTimeLen n field can be created corresponding to the TimeNum n field, which indicates the quantity of the sample playback parts of the rights-protected media file.

For example, if there are two sample playback parts, the TimeNum n field is set as TimeNum 2 such that the StartTimeLen n field contains start time information on the first and second sample playback parts and the EndTimeLen n field contains end time information of the first and second sample playback parts.

That is, in an exemplary embodiment of the present invention, a plurality of sample playback parts can be set for a single rights-protected media file.

Once the information on the start and end times of the sample playback part of the rights-protected media file is extracted, the DRM-enabled mobile device replays the sample playback part on the basis of the extracted information (S313).

That is, the DRM-enabled mobile device starts replaying the sample playback part of the rights-protected media file at the start time and ends replaying the sample playback part of the rights-protected media file at the end time.

After ending the playback of the sample playback part, the DRM-enabled mobile device determines whether another sample playback part exists (S315). In order to determine the quantity of the sample playback parts, the DRM-enabled mobile device refers to the TimeNum n field of Table 2. If more than one sample playback parts exist, the DRM-enabled mobile device replays the sample playback parts in a sequential order.

If it is determined that another sample playback part does not exist, the DRM-enabled mobile device ends the procedure of replaying the sample playback part (S317).

As described above, the DRM method and DRM-enabled mobile device of the exemplary embodiments of the present invention allow an unlicensed user to replay a sample playback part of a rights-protected media file, whereby it is possible to improve user convenience and stimulate purchase desire of users.

Also, since the DRM method and DRM-enabled mobile device of the exemplary embodiments of the present invention allow a user to experience sample content of a rights-protected media file, the user can verify whether the media file is that desired.

Further, due to the improvement of user convenience through sampling the rights-protected contents, the DRM method and DRM-enabled mobile device of the exemplary embodiments of the present invention have an effect of decreasing illegal copying and increasing distribution of the rights-protected contents.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains While the invention has been shown and described with reference to certain exemplary embodiments thereof, it will be understood that various changes in form and details may be made therein without departing from the spirit and scope of the present invention as defined by the appended claims.

What is claim is:

1. A digital rights management method for a mobile device, comprising:
   determining whether a playback request is input for replaying a media file;
   if a playback request is input for replaying a media file, determining whether the playback request is performed by a licensed user of the media file with reference to an information field of the media file;
   if the playback request is performed by an unlicensed user, determining whether the media file has at least one sample playback part of a rights-protected media file and permitting a playback of the sample playback part;
   if the media file has the at least one sample playback part of the rights-protected media file and the playback of the sample playback part is permitted, extracting start and end times of the sample playback part; and
   replaying the sample playback part according to the start and end times.

2. The digital rights management method of claim 1, wherein the information field comprises at least two of the following items (a)-(n):
   (a) a SamplePlayEnable quantity representing a sample playback when it is determined to be true and a rejected sample playback when it is determined to be false;
   (b) a TimeNum n quantity representing a quantity of sample playback parts;
   (c) a StartTimeLen 1 quantity representing a length of start time of part 1 of a sample playback;
   (d) a StartTime 1 quantity representing a corresponding start time;
   (e) an EndTimeLen 1 quantity representing a length of end time of part 1 of a sample playback;
   (f) an EndTime 1 quantity representing a corresponding end time;
   (g) a StartTimeLen 2 quantity representing a length of start time of part 2 of a sample playback;
   (h) a StartTime 2 quantity representing a corresponding start time;

(i) an EndTimeLen 2 quantity representing a length of end time of part 2 of a sample playback;
(j) an EndTime 2 quantity representing a corresponding end time;
(k) a StartTimeLen n quantity representing a length of a start time of part n of a sample playback;
(l) a StartTime n quantity representing a corresponding start time;
(m) an EndTimeLen n quantity representing a length of an end time of part n of a sample playback; and
(n) an EndTime n quantity representing a corresponding end time.

3. The digital rights management method of claim 1, further comprising, if the playback request is performed by a licensed user, replaying the entire media file.

4. The digital rights management method of claim 1, wherein the licensed user is validated by a unique identifier of the media file.

5. The digital rights-management method of claim 1, wherein the sample playback part and the playback of the sample playback part are defined in the information field.

6. The digital rights-management method of claim 1, wherein the start and end times of the sample playback part are obtained from the information field.

7. The digital rights-management method of claim 1, wherein a plurality of sample playback parts can be set according to a setting method.

8. The digital rights management method of claim 1, further comprising:
   determining whether another sample playback part to be played exists; and
   if another sample playback part to be played exists, replaying the sample playback part.

9. The digital rights management method of claim 8, wherein a quantity of sample playback parts is defined by the information field.

* * * * *